United States Patent [19]

Kurafuji

[11] Patent Number: 4,495,534
[45] Date of Patent: Jan. 22, 1985

[54] TAPE PLAYER
[75] Inventor: Takamasa Kurafuji, Yokohama, Japan
[73] Assignee: Tokyo Shibaura Denki Kabushiki Kaisha, Japan
[21] Appl. No.: 465,098
[22] Filed: Feb. 9, 1983
[30] Foreign Application Priority Data
  Feb. 9, 1982 [JP] Japan .................. 57-19271
[51] Int. Cl.$^3$ .................. G11B 15/22
[52] U.S. Cl. .................. 360/74.1; 242/186; 360/74.2
[58] Field of Search .................. 242/186, 191; 360/71, 360/73, 74.1, 74.2

[56] References Cited
U.S. PATENT DOCUMENTS
  4,170,789 10/1979 Inoue .................. 360/137

FOREIGN PATENT DOCUMENTS
  55-128235  9/1980  Japan .
  1451688   10/1976  United Kingdom .
  2004403    3/1979  United Kingdom .
  2049257   12/1980  United Kingdom .
  2060237    4/1981  United Kingdom .
  1594235    7/1981  United Kingdom .
  2077481   12/1981  United Kingdom .
  2079032    1/1982  United Kingdom .

Primary Examiner—George G. Stellar
Attorney, Agent, or Firm—Finnegan, Henderson, Farabow, Garrett & Dunner

[57] ABSTRACT

A tape stop detecting mechanism for a tape player includes a chassis carrying (a) a first rotary member having a thrusting portion and rotating while the tape runs, (b) a second rotary member having an engagement portion and rotating irrespective of the running of the tape, (c) a holding structure, and (d) a rocking member releasably retained by the holding structure. The rocking member has first and second contacting portions corresponding to the thrusting portion and engagement portion, respectively. The rocking member is rocked around the holding structure in response to the thrusting portion urging the first contacting portion while the tape runs. The rocking member, on the other hand, is rocked by the first rotary member in response to the engagement of the second contacting portion with the engagement portion of the second rotary member and rotation of the second rotary member.

24 Claims, 8 Drawing Figures

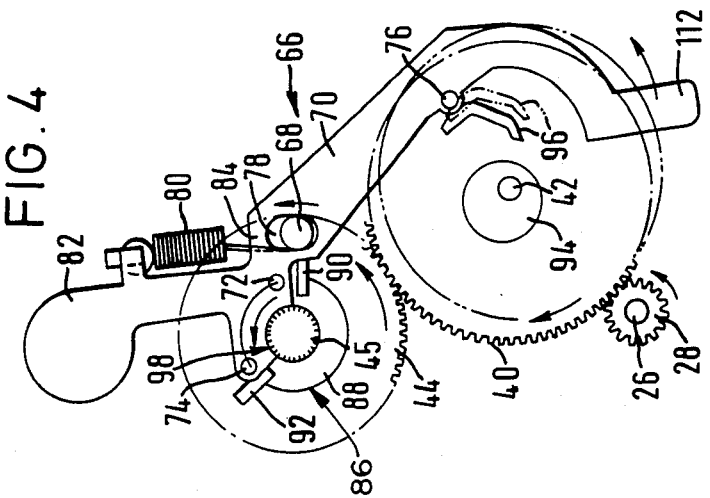

TAPE PLAYER

FIELD OF THE INVENTION

This invention relates to a tape player and, more particularly, to a tape player provided with a mechanism which reliably detects stopping of the tape, for example, at the end of running of the tape during play back, record, fast forward, rewind, etc.

BACKGROUND OF THE INVENTION

In recent years, a tape stop detecting mechanism has been developed in which the detecting mechanism performs the detection operation by detecting stoppage in the rotation of a tape reel rest on which is mounted a tape reel. In conventional tape stop detecting mechanisms, two rotary members and a lever are provided. The first rotary member is frictionally engaged with the tape reel rest and the second rotary member has both a cam portion and an engagement portion. The first rotary member rotates or stops with the tape reel rest whereas the second rotary member rotates continuously. The lever is arranged to be urged in one direction by the cam portion of the second rotary member into a position where the lever is able to engage with engagement portion of the second rotary member.

However, the lever is simultaneously urged in another direction by the first rotary member so that the lever may, in fact, be prevented from engaging with the engagement portion of the second rotary member. Furthermore, the conventional tape stop detecting mechanism has a disadvantage in that the tape stop detecting operation may erroneously occur at the time of, for example, the beginning of play back operation. This results from the engagement portion of the second rotary member accidentally engaging the lever before the first rotary member reaches into engagement with the lever, due to a large marginal rotation gap therebetween. The conventional tape stop detecting mechanism has another disadvantage in that it is difficult to manufacture in proper positional arrangement because the positional relationship of the lever relative to both rotary members is very critical in order to accurately perform the tape stop detecting operation and to prevent false detection such as of the beginning of the tape play back.

SUMMARY OF THE INVENTION

It is, therefore, an object of the present invention to provide a tape stop detecting mechanism for reliably detecting stopping of the running of a tape.

Another object of the present invention is to provide a tape stop detecting mechanism having a simple construction and which can easily be manufactured.

According to the present invention, the tape player is provided with a chassis; means for running a tape, the tape running means being supported on the chassis; a first rotary member adapted to rotate while the tape runs; thrusting means driven by a rotation of the first rotary member; a second rotary member adapted to rotate regardless of running of the tape, the second rotary member including an engagement section rotatable therewith; holding means formed on the chassis; and a rocking member releasably held by the holding means and provided with first and second engagement portions corresponding, respectively, to the thrusting means and to the engagement section of the second rotary member, the rocking member making a first rocking movement about the holding means in response to the thrusting means contacting the first engagement portion during running of the tape for preventing contact between the second engagement portion and the engagement section of the second rotary member, and the rocking member making a second rocking movement about the holding means in response to the second engagement portion contacting the engagement section of the second rotary member and rotation of the second rotary member for determining stoppage of running of the tape.

Additional objects and advantages of the present invention will become apparent to persons skilled in the art from a study of the following description and the accompanying drawings.

BRIEF DESCRIPTION OF THE DRAWINGS

FIGS. 2-4 are schematic top plan views illustrating the operation of the tape stop detecting mechanism employed in the tape player of FIG. 1:

DESCRIPTION OF THE PREFERRED EMBODIMENT

Figure 1:
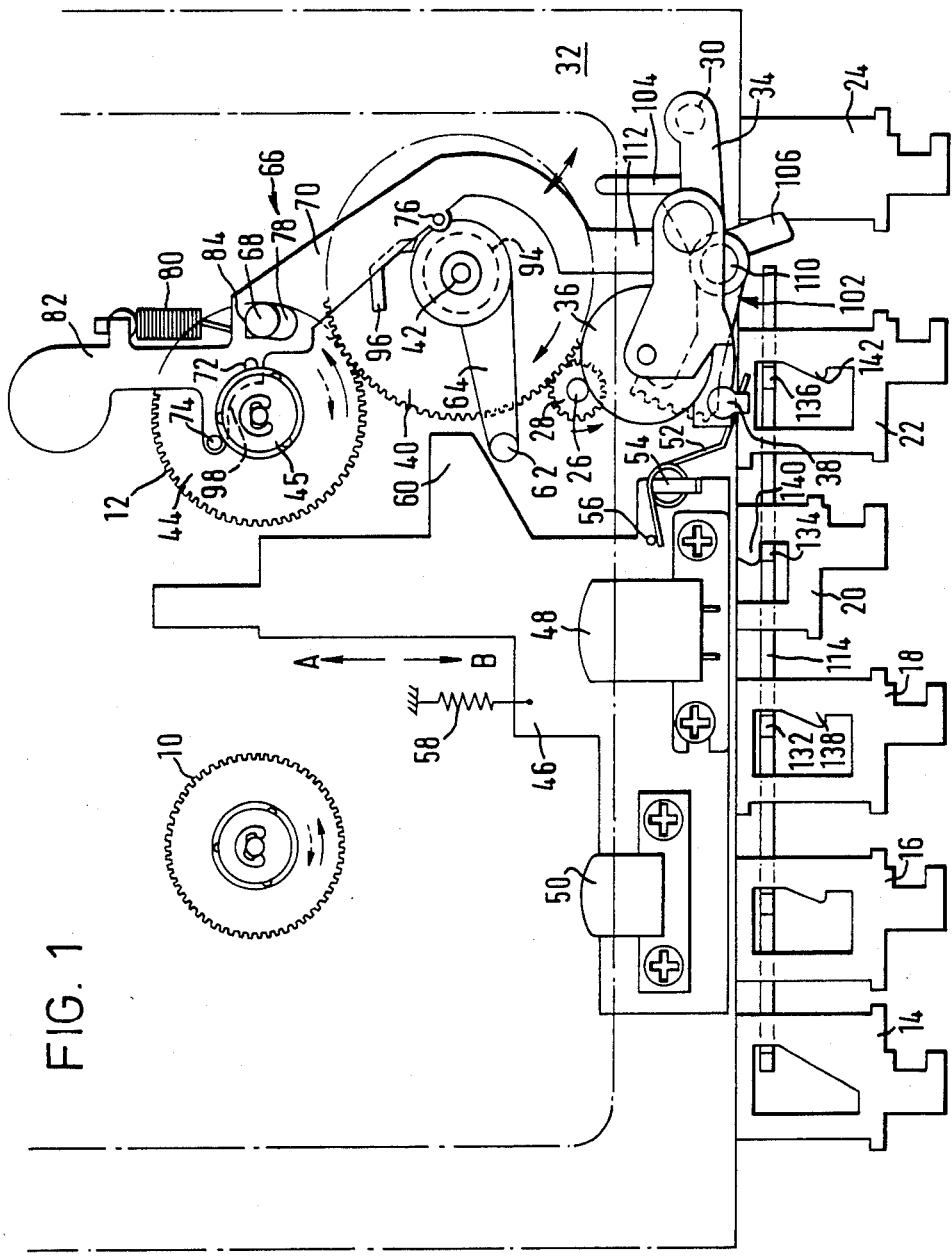
FIG. 1 is a schematic top plan view of a tape player constructed in accordance with the present invention.

The present invention will now be described in detail with reference to FIGS. 1-8. Throughout the drawings, like reference numerals are used to designate like or equivalent elements for the sake of simplicity and ease of understanding.

FIG. 1 schematically illustrates a tape player embodying the present invention. The tape player generally includes a supply reel rest 10, a take-up reel rest 12, a set of control push-rods, for example, a stop push-rod 14, a record push-rod 16, a rewinding push-rod 18, a play back push-rod 20, a fast forward push-rod 22 and a temporary stop or pause push-rod 24. It is to be understood, however, that the foregoing are merely illustrative of the various functional push-rods and features of a tape recorder, and are not to be interpreted in a limiting sense.

A capstan 26 is provided which is rotated at a constant speed by a motor (not shown) and to which a capstan gear 28 is secured. A shaft 30 is fixed to chassis 32 with a pinch roller lever 34 pivotally mounted thereon. Pinch roller lever 34 is coupled to a pinch roller 36 which is rotatably mounted on a pin 38 fixed to pinch roller lever 34. An idler gear 40 is pivotally mounted on a shaft 42 that is slidably mounted on chassis 32 and urged clockwise in FIG. 1 so as to connect idler gear 40 to both capstan gear 28 and take-up reel gear 44, the latter being frictionally engaged with take-up reel spindle 45 of take-up reel rest 12 by a spring (not shown). This assembly is carried on a head chassis 46 that is mounted on chassis 32 for selective sliding movement in either of the directions shown by the arrows A and B. Head chassis 46 may also carry a recording and reproduction head 48 and an erasing head 50; the number of heads may vary according to the specifics of the tape recorder mechanism without departing from the spirit and scope of the present invention.

According to a preferred embodiment, the tape player further includes a spring 52 mounted at its central portion on a projection 54 secured to head chassis 46, with one end of spring 52 contacting a pin 56 on head chassis 46, while the other end thereof is engaged with a spring receiving portion 38 of pinch roller lever 34. Head chassis 46 is subjected to a force by spring 58 for advancing the head chassis in the direction of the arrow A when, for example, play back push-rod 20 is depressed. The head chassis is held in a stationary position, as depicted in FIG. 1, during stopping, rewinding and fast forwarding operations, since play back push-rod 20 is also in a stationary position at that time and prevents the advancing of head chassis 46 against spring 58 in a known manner. Similarly, pinch roller lever 34 is urged in a clockwise direction about pin 30 by spring 52 when the head chassis is advanced in the direction of arrow A, such that pinch roller 36 is connected to rotate with capstan 26. Conversely, pinch roller lever 34 is urged in a counter-clockwise direction by movement of head chassis 46 in the direction of arrow B and pinch roller 36 is thereby disconnected from rotational engagement with capstan 20. Further, in moving head chassis 46 in the direction of arrow B, idler restricting portion 60 of head chassis 46 is disengaged from a pin 62 mounted on an idler rod 64 projecting from idler shaft 42. In the illustrative embodiment shown in FIG. 1, idler gear 40 contacts with take-up reel gear 44 and capstan gear 28 as described above during recording and play back operations.

According to a preferred embodiment of the present invention, the tape player further includes a tape stop detecting mechanism 66. As embodied herein, tape stop detecting mechanism includes a rocking member 70 held on a shaft 68 secured to chassis 32. Rocking member 70 has at one end portion thereof engaging pins 72, 74 facing take-up reel spindle 45 and, at the other end portion thereof, an engaging pin 76 facing idler shaft 42. Rocking member 70 has formed at its central portion a hollow or elongated hole 78 through which rocking member 70 is movably held by shaft 68. Rocking member 70 is biased toward the direction of the arrow B by a spring 80 which is connected between shaft 68 and a projecting portion 82 of rocking member 70 so that a bearing portion 84 of rocking member 70 defined by an upper end of elongated hole 89, as shown in FIG. 1, is biased to normally engage with shaft 68.

Referring now to FIG. 2 which shows the tape stop detecting mechanism 66 during rotation of take-up reel spindle 45, take-up reel rest 12 includes a thrust device 86 having a rotary member 88 frictionally engaging with take-up reel spindle 45. Thrust device 86 further includes thrust members 90, 92 secured on rotary member 88 and facing engaging pins 72, 74, respectively, of rocking member 70. On idler gear 40 are provided cam plate 94 and engaging plate 96 both integral therewith. According to a preferred embodiment, cam plate 94 has a round cam face in an eccentric rotational relationship about idler shaft 42. Engaging plate 96 is located in a position separated from cam plate 94, but intersecting the overall rotating path of cam plate 94.

During counter-clockwise rotation of take-up reel spindle 45, thrust member 90 on rotary member 88 contacts engaging pin 72 of rocking member 70 and urges pin 72 in a clockwise direction relative shaft 68. This causes rocking member 70 to be rocked in a clockwise direction about shaft 68 by virtue of the contact with bearing portion 84 so that engaging pin 76 of rocking member 70 contacts the round cam face of cam plate 94. Because cam plate 94 is continuously rotating, rocking member 70 is alternately rocked in both directions since engaging pin 76 is in contact at all times with the round cam face of cam plate 94.

Referring now to FIG. 3 which shows tape stop detecting mechanism 66 immediately after rotation of take-up reel reel spindle 45 has stopped. Rotary member 88 of thrusting device 86 stops in accordance with the stopping of take-up reel spindle 45 so that thrust member 90 ceases to contact engaging pin 72 of rocking member 70. Since this contact has ceased, the biasing of spring 80 causes a slight counter-clockwise rotation of rocking member 70 about pin 68 such that bearing portion 98 closely faces or contacts take-up reel spindle 45. At the same time, rocking member 70 is forced apart from cam plate 94 into a position in the path of engaging plate 96 which is on idler gear 40 that continues to rotate.

Referring now to FIG. 4 which shows tape stop detecting mechanism 66 in the detecting operation, as idler gear 40 continues to rotate, engaging plate 96 contacts engaging pin 76 of rocking member 70. Engaging pin 76 is constructed such that further rotation of idler gear 40 causes engaging pin 76 to be urged farther away from shaft 42 which moves rocking member 70 in counter-clockwise direction about shaft 68. Since bearing portion 98 on the end portion of rocking member 70 is already pressed against take-up reel spindle 45, however, further rotation of idler gear 40 and the urging of engaging plate 96 on engaging pin 76 causes rocking member 70 to be rocked about take-up reel spindle 45 against the biasing of spring 80. During this rocking of rocking member 70 about take-up reel spindle 45, bearing portion 84 is disengaged from shaft 68 and elongated hole 78 guides the rocking of rocking member 70 about take-up reel spindle 45.

Due to the arrangement described above, the end portion of rocking member 70 is permitted to come up to a position contacting or nearly contacting take-up reel spindle 45. In other words, the marginal gap between the rocking member and the take-up reel spindle, which is needed in conventional tape stop detecting mechanisms for permitting rocking of a rocking member, is unnecessary according to the present invention. Therefore, at the start of a tape operation, for example, play back, thrust member 90 of thrusting device 86 can quickly come into contact with thrusting engaging pin 72 of rocking member 70, as shown in FIG. 2, so that engaging pin 76 is prevented from erroneously engaging with engaging plate 96.

Figure 5:
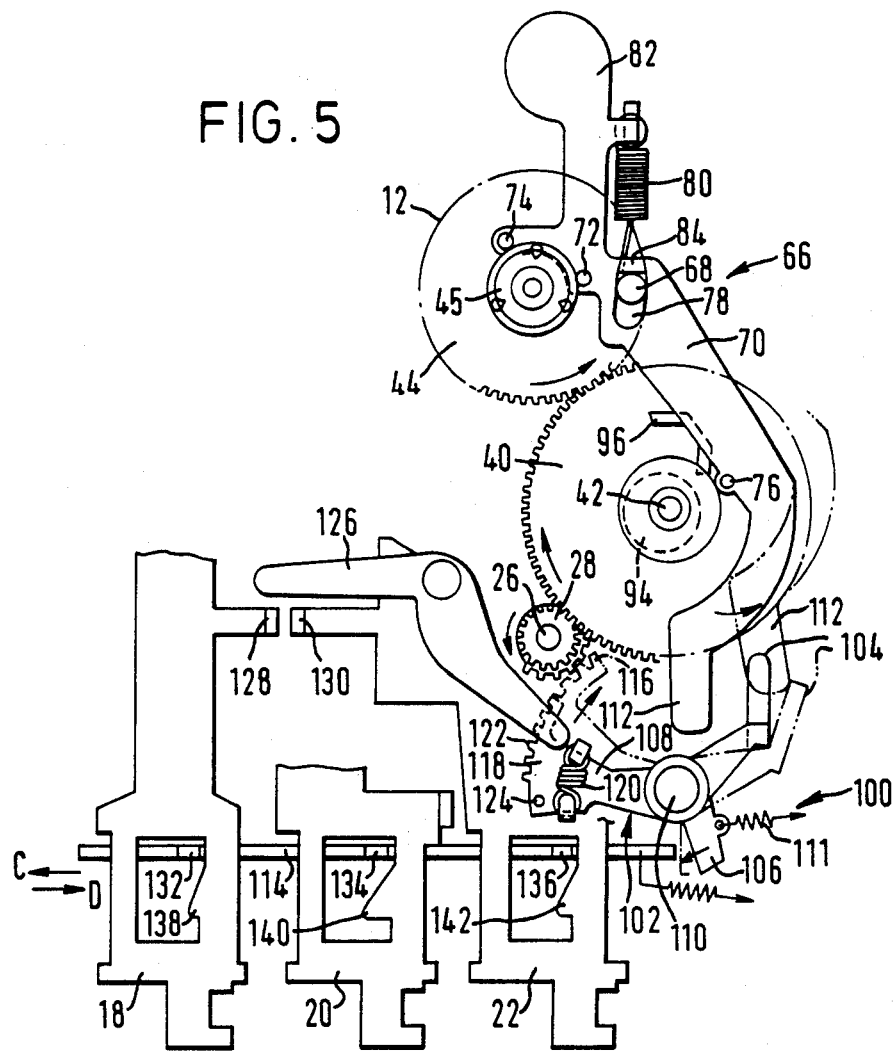
FIG. 5 is a schematic top plan view of an auto shut-off device associated with the tape stop detecting mechanism employed in the tape player of FIG. 1.

Reference is now made to FIG. 5 which shows an automatic shut-off device 100 operable in accordance with the tape stop detecting mechanism 66 of the present invention. A rocking member 102 with three arms 104, 106 and 108 is rockably mounted on a shaft 110 which is fixed on chassis 32 (not shown). First arm 104 is arranged so as to drive portion 112 formed on the lower end of rocking member 70. Second arm 106 is arranged so as to drive an end of a lock plate 114 which is slidable in the directions of arrows C and D perpendicular to arrows A and B, and which is adapted to lock the set of push-rods, e.g. 18, 20 and 22, but not stop push-rod 14, in their operating positions. Rocking member 102 is usually biased in the counter-clockwise direction by a spring 111 in order to prevent accidental engagement between the third arm and capstan gear 28, since third arm 108 has a short gear section 116 which is selectively engagable with capstan gear 28.

In operation, drive portion 112 of rocking member 70 pushes against first arm 104 when rocking member 70 is moved in the counter-clockwise direction by engaging plate 96 on idler gear 40. The pushing by drive portion 112 causes rocking member 102 to rotate in a clockwise direction until short gear section 116 enters into engagement with capstan gear 28, as shown in FIG. 5 by the double-dot line. After that, capstan gear 28 moves rocking member 102 farther which causes second arm 106 to rotate and push sliding lock plate 114.

Rocking member 102 is also provided with a lever 118 which is rockably mounted on shaft 110 and is connected to third arm 108 by a spring 120 therebetween. Lever 118 has a long gear section 122, also engagable with spindle gear 28, and a protruding pin 124. Pin 124 is engagable with one end of a select lever 126 whose other end is engagable with either one of projections 128, 130 provided on rewind push-rod 18 and fast forward push-rod 22, respectively. When rewind push-rod 18 or fast forward push-rod 22 is in the operating position, select lever 126 is rocked by either projection 128 or 130 in the clockwise direction so that the end of select lever 126 is located in a position in the path of travel of lever 118 and restricts movement of lever 118 in the clockwise direction. Therefore, if either rewind or fast forward push-rod 18 or 22 has been operated, lever 118 is fixed and only rocking member 102 is rocked so that only short gear section 116 engages with capstan 28 in the operation of tape stop detecting mechanism 66. In this event, rocking member 102 is rocked only a relatively small angle by capstan gear 28 so that lock plate 114 is moved a correspondingly short distance by second arm 106. Conversely, if select lever 126 has not been so moved, lever 118 is rocked together with rocking member 102 and long gear section 122 engages with capstan gear 28. Thus, rocking member 102 is rocked in a relatively large angle and lock plate 114 is moved a long distance.

According to a preferred embodiment of the present invention, lock plate 114 is provided with locking bars, for example, bars 132, 134, 136 corresponding, respectively, to rewind, play back and fast forward push-rods 18, 20 and 22. The push-rods, except stop push rod 14, have hooks 138, 140 and 142 which are lockingly engagable with bars 132, 134 and 136, respectively. Each hook 132, 134 and 136 has an inclined edge for engaging and sliding lock plate 114 in the direction of arrow C, and a barring edge of a type known and utilized in conventional tape players. Unlike conventional arrangements, however, hook 140 of play back push-rod 20 has a long barring edge while hooks 138 and 142 of rewind and fast forward push-rods 18 and 22 have short barring edges, according to a preferred embodiment of the present invention.

Figure 6:
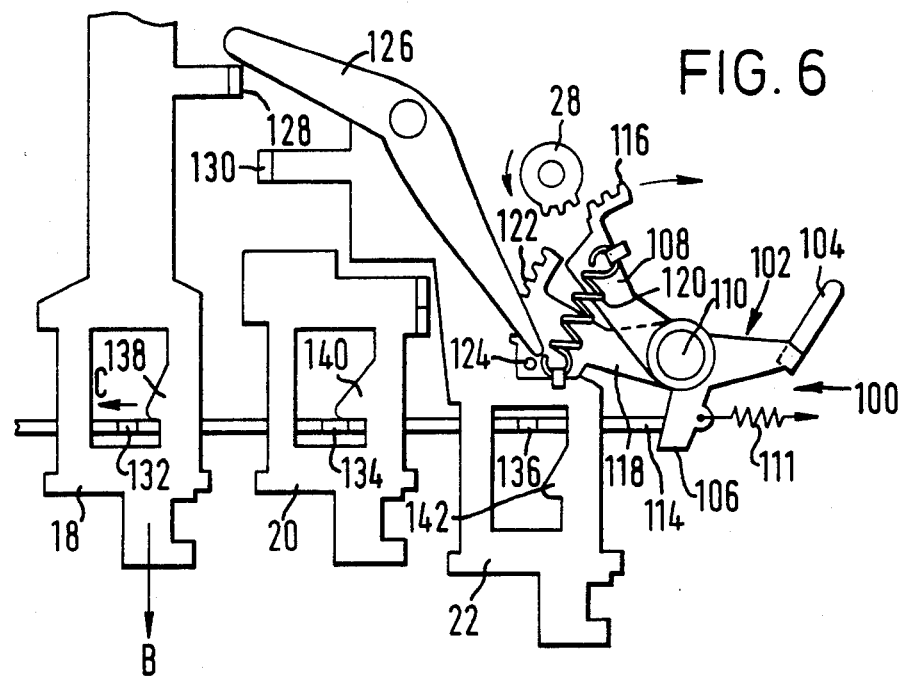
FIGS. 6 and 7 are schematic top plan views illustrating the operation of the auto shut-off device of FIG. 5 when the tape player is in auto-reverse and play back operations, respectively.

Referring now to FIG. 6, it is assumed that hook 140 of play back push-rod 20 and one of hooks 138 and 142 of rewind and fast forward push-rods 18 and 22, for example, hook 138, are locked by bars 134 and 132. In this condition, select lever 126 is rocked by projection 128 into a position where the end of select lever 126 closely faces or contacts pin 124 so that movement of lever 118 in the clockwise direction is restricted. Therefore, only short gear section 116 engages with capstan gear 28 in accordance with the operation of tape stop detecting mechanism 66. This results in lock plate 114 being slid a short distance in the direction of arrow C. With the sliding of lock plate 114, hook 138 of rewind push-rod 18 is released from bar 132 while hook 140 of play back push-rod 20 is left in engagement condition with bar 134. Accordingly, the tape player automatically changes to the play back mode after the rewinding operation has finished, i.e. so-called auto-play operation.

Figure 7:
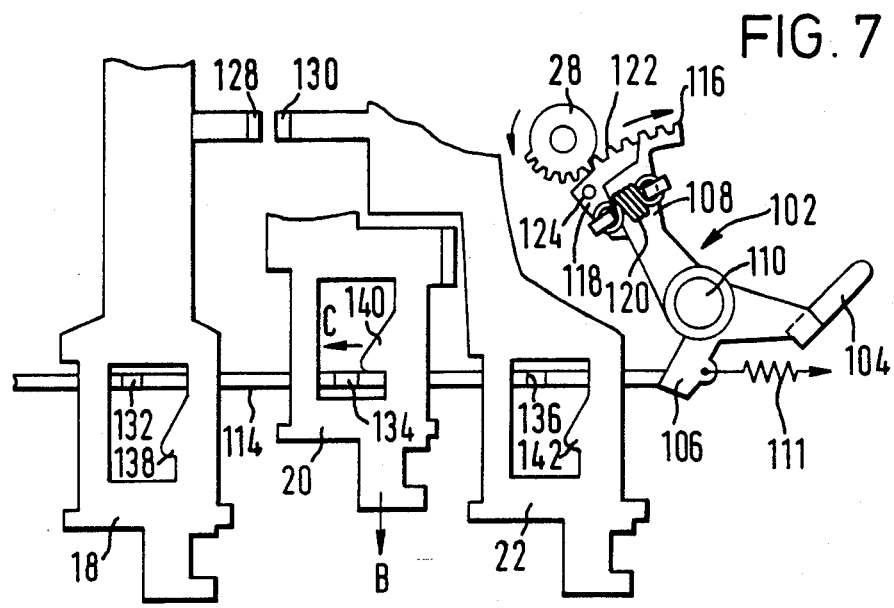

Referring now to FIG. 7, it is assumed that either of rewind and fast forward push-rods 18, 22 is in its stationary position. The end of select lever 126 (not shown) is therefore free from projections 128, 130 of rewind and fast forward push-rods 18, 22 so that select lever 126 fails to restrict the rocking of lever 118. In this condition, long gear section 122 engages with capstan gear 28 so that rocking member 102 is rocked across a large angle in accordance with the operation of tape stop detecting mechanism 66. This large sweep causes lock plate 114 to be slid a distance long enough to release hook 140 of play back push-rod 20 from bar 134. This moves the play back push-rod out of operation so that the automatic shut-off operation is completed.

Figure 8:
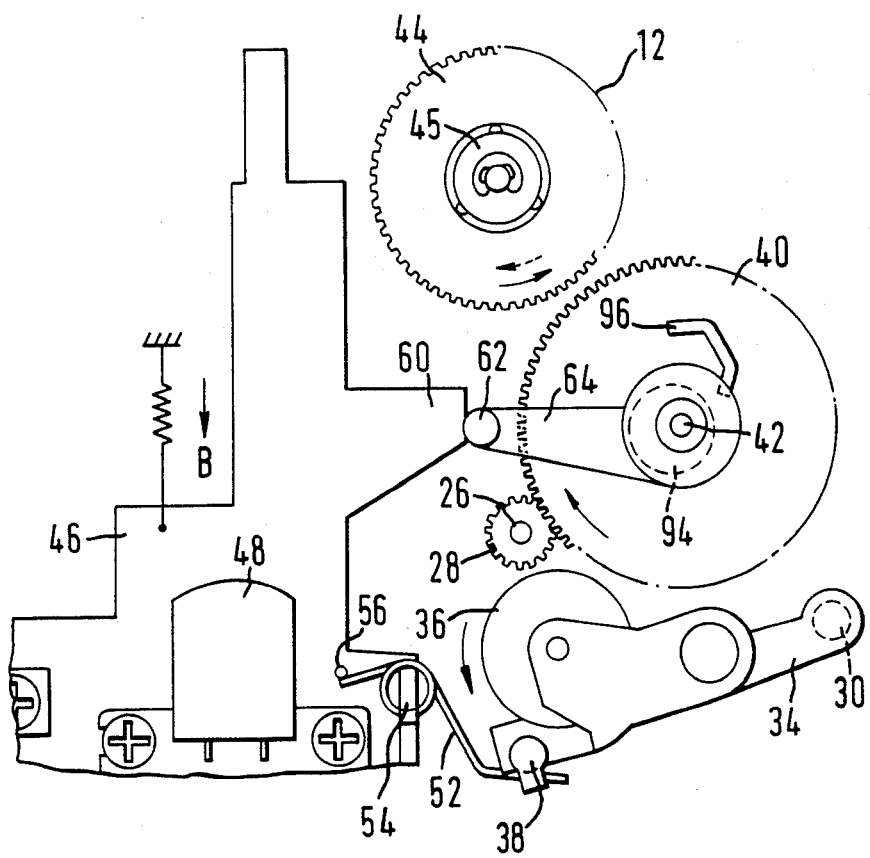
FIG. 8 is a schematic top plan view of a tape drive device employed in the tape player of FIG. 1 in a fast forwarding or rewinding operation.

Reference is now made to FIG. 8 which shows the tape drive device in either rewind or fast forward operation condition in which idler gear 40 is removed from take-up reel gear 44. This is due to the engagement of idler restricting portion 60 of head chassis 46 with pin 62 of idler rod 64 as head chassis 46 is moved in the direction of arrow B. Take-up reel rest 12 may be driven by any one of the conventional fast forwarding or rewinding mechanisms (not shown). In the fast forward operation, take-up reel rest 12 is directly dirven by such a mechanism in the counter-clockwise direction. In the rewind operation, take-up reel rest 12 is driven in the clockwise direction by virtue of the tape running from the take-up reel rest 12 to the supply reel rest 10 which is directly driven by the mechanism.

In the fast forward operation, thrust member 90 of thrusting device 86 contacts engaging pin 72 of rocking member 70 (see FIG. 2) and causes it to be rocked in the clockwise direction similar to the play back operation described above. On the other hand, in the rewind operation, thrust member 92 contacts engaging pin 74 of rocking member 70 which is again rocked in the clockwise direction. Thus, in either fast forward or rewind operations, the relative positions of take-up reel rest 12 and rocking member 70 are kept nearly the same as that shown and described for play back conditions, provided that idler gear 40 has been moved by portion 60. Accordingly, operation of tape stop detecting mechanism 66 in either fast forward or rewind operations may be accomplished.

Inasmuch as the present invention is subject to many variations, modifications and changes in detail, it is intended that all matter contained in the foregoing description or shown in the accompanying drawings be interpreted as illustrative and not in a limiting sense. Accordingly, it should be evident to those skilled in the art that minor variations may be made in the disclosed embodiments without departing from the spirit and scope of the invention.

What is claimed is:

1. A tape player comprising:
  a chassis;
  means for running a tape, said tape running means being supported on said chassis;

a first rotary member adapted to rotate while the tape runs;

thrusting means driven by rotation of said first rotary member;

a second rotary member adapted to rotate regardless of running of the tape, said second rotary member including an engagement section rotatable therewith;

holding means formed on said chassis; and a rocking member releasably held by said holding means and provided with first and second engagement portions corresponding, respectively, to said thrusting means and to said engagement section of said second rotary member, said rocking member making a first rocking movement about said holding means in response to said thrusting means contacting said first engagement portion during running of the tape for preventing contact between said second engagement portion and said engagement section of said second rotary member, and said rocking member making a second rocking movement about said holding means in response to said second engagement portion contacting said engagement section of said second rotary member and rotation of said second rotary member for detecting stoppage of the running of the tape.

2. A tape player according to claim 1, wherein said holding means is a stopper adapted to restrict said second rocking movement of said rocking member.

3. A tape player according to claim 2, wherein said stopper is a shaft protruding from said chassis.

4. A tape player according to claim 3, wherein said rocking member includes a hollow enclosing said shaft.

5. A tape player according to claim 4, further comprising:

first means for biasing said rocking member against said shaft, whereby said rocking member makes said second rocking movement against said first biasing means in response to said engagement section of said second rotary member contacting said second engagement portion of said rocking member and rotation of said second rotary member.

6. A tape player according to claim 5, wherein said thrusting means includes a third rotary member rotating in frictional engagement with said first rotary member.

7. A tape player according to claim 6, wherein said second rotary member is provided with an eccentric cam portion rotatable in relation to rotation of said second rotary member; and said second engagement portion of said rocking member contacts said eccentric cam portion during said first rocking movement of said rocking member.

8. A tape player according to claim 7, further comprising;

means for actuating said tape running means into an operation condition, said actuating means being movable between a first position which brings said tape running means into said operation condition, and a second position in which said tape running means is not brought into said operation condition;

means for said actuating means from said second position to said first position; and a drive provided on said rocking member, said drive portion engaging said shifting means such that said actuating means is shifted into said first position when said rocking member makes said second rocking movement.

9. A tape player according to claim 8, further comprising:

means for locking said actuating means in said first position; and means for releasing said actuating means from said locking means; and wherein said shifting means includes a second means for biasing said actuating means toward said second position; and said drive portion of said rocking member pulling against said second biasing means when said drive portion engages said shifting means and thereby driving said releasing means into operation.

10. A tape player according to claim 9, wherein said first rotary member is a reel rest for mounting thereon a tape reel for winding the tape.

11. A tape player according to claim 10, wherein said reel rest is a take-up reel rest driven by said tape running means.

12. A tape player according to claim 11, wherein said second rotary member is an idler wheel connecting said tape running means to sake take-up reel rest.

13. A tape player according to claim 10, wherein said reel rest is a supply reel rest driven by running of the tape.

14. A tape player according to claim 7, further comprising:

selectively operable first and second means for actuating said tape running means into operating conditions for driving said first rotary member, respectively, in first and second rotation conditions that are different from each other, said first and second actuating means each being movable between a first position, in which said first rotary member is brought into said operating conditions, in which said first rotary member is not in said operation condition;

selectively operable first and second means for shifting, respectively, said first and second actuating means from said first position to said second position; and a drive portion providing on said rocking member and adapted to bring one of said first and second shifting means into operation when said rocking member makes said second rocking movement.

15. A tape player according to claim 14, further comprising:

means for locking said first and second actuating means in said first position; and means for releasing said first and second actuation means from said locking means; and wherein said first and second shifting means include, respectively, second and third means for biasing, respectively, said first and second actuating means towards said second position; and said drive portion of said rocking member pulls against one of said second and third biasing means when said drive portion is driving said releasing means into operation.

16. A tape player according to claim 15, wherein said first rotary member is a first reel rest for mounting a first tape reel for winding the tape.

17. A tape player according to claim 16, wherein said first reel rest is a take-up reel rest driven by said tape running means.

18. A tape player according to claim 17, wherein said second rotary member is an idler wheel connecting said tape running means to said take-up reel rest.

19. A tape player according to claim 16, wherein
said first and second rotation conditions of said first reel rest are, respectively, rotations in one direction and in another direction opposite to said one direction, and
said first reel rest being driven in said one and other rotation direction, respectively, by said tape running means and the tape in running condition.

20. A tape player according to claim 19, further comprising:
a second reel rest for mounting a second tape reel, the tape being wound on said first and second tape reels, said second reel rest being selectively driven by said tape running means, and wherein
said second rotary member is an idler wheel for selectively connecting said tape running means to one of said first and second reel rests.

21. A tape player according to claim 17, wherein
said first and second rotation conditions of said take-up reel rest are, respectively, rotations at a slow speed and a fast speed, and
said take-up reel rest being driven by said tape running means selectively at one of said slow and said fast speeds.

22. A tape player according to claim 21, wherein said second rotary member is an idler wheel connecting said tape running means to said take-up reel rest when said first actuating means is locked in said first position by said locking means.

23. A tape player according to claim 19, wherein said third rotary member is provided with first and second thrusting portions engagable with said first engagement portion of said rocking member in response to said one and to said other rotation directions, respectively, of said first reel rest.

24. A tape player according to claim 23, wherein said first engagement portion of said rocking member includes first and second engagement sections corresponding, respectively, to said first and second thrusting portions of said third rotary member.

* * * * *